A. Mears.
Cheese Turner.
Nº 40,214.          Patented Oct. 6, 1863.
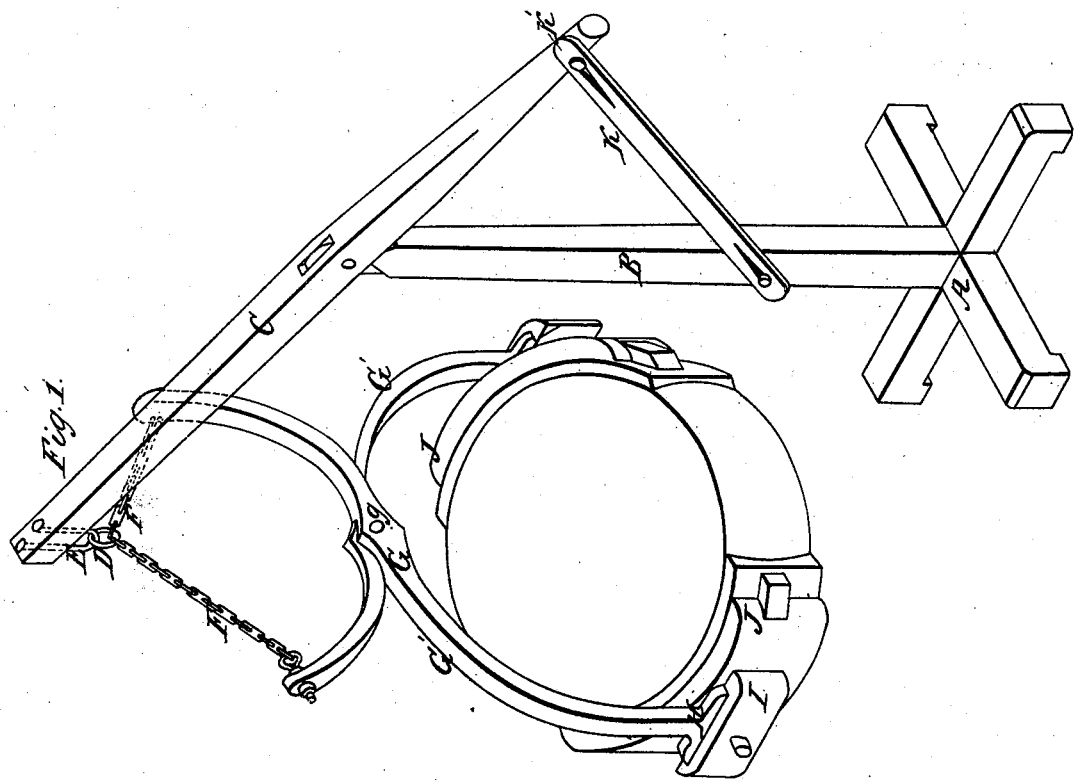
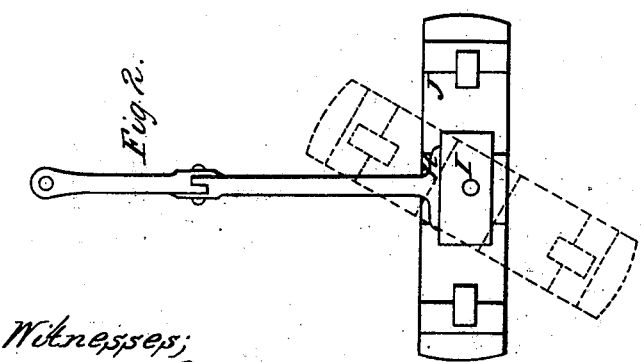
Witnesses:
Charles Smith
R. H. Mayhew
Inventor:
A. Mears
Per Munn & co
Attorneys

UNITED STATES PATENT OFFICE.

ALLISON MEARS, OF BRASHEAR, ASSIGNOR TO HIMSELF AND ABIEL O'DELL, OF ONEIDA COUNTY, NEW YORK.

CHEESE-TURNING APPARATUS.

Specification forming part of Letters Patent No. 40,214, dated October 6, 1863.

*To all whom it may concern:*

Be it known that I, ALLISON MEARS, of Brashear, in the county of St. Lawrence and State of New York, have invented a certain new and Improved Device for Turning Single Cheeses; and I do hereby declare the following to be a full and exact description thereof, reference being had to the accompanying drawings, making part of this specification, in which—

Figure 1 is a perspective view of my improved device. Fig. 2 is a side elevation of a portion thereof, illustrating more clearly the operation of the turning mechanism.

Similar letters of reference indicate corresponding parts in the several figures.

The subject of this invention is a device for turning single cheeses for the purpose of greasing them and allowing each part to be equally benefited by exposure to the atmosphere.

The invention consists in a novel construction of tongs, having pivoted clasps or clamp-jaws attached to their lower ends, working in combination with a lever, as will be hereinafter fully explained.

To enable others skilled in the art to which my invention appertains to fully understand and use the same, I will proceed to describe its construction and operation.

In the accompanying illustration, A is a pedestal, from which rises a post or upright, B, at the top of which is fulcrumed a lever, C. An iron ring, D, is attached to one end of this lever by a staple, E, and from said ring depend chains or ropes F F, which are fastened to the upper ends of metallic tongs G in any suitable manner. The arms G' G' of the said tongs G are pivoted at g, and from that point are curved outward to such an extent as that no obstruction will be offered to the cheese while being turned between said arms. To the lower furcated end, H, of each arm is rigidly secured a block or washer, I, of hard wood, for the purpose of forming a better junction between the tongs and wooden clamp-jaws J J, which are pivoted to said washers, so as to admit of their free rotation upon the same. These jaws J, as shown in the drawings, are made in curved form, their inner surfaces corresponding to the shape of the cheese. The opposite end of the lever C from that at which the tongs are suspended is designed to be held down, while the cheese is held between the jaws of the tongs, by a strap, K, fastened by a pin or hook, k, to the post B and looping over a similar hook, k', on said end.

Operation: The machine being placed in the required proximity with the cheese to be turned, the jaws J J are carefully adjusted at opposite sides thereof. The handle of the lever C is then depressed, which causes the jaws J J to approach each other, their weight on the elevation of the tongs being fully sufficient to effect this object, and firmly clasp and partially encircle the cheese. The latter may now be elevated to the desired height and held in this position by looping the strap K over the hook k'.

It will be manifest that, owing to the peculiar manner of pivoting the jaws J J to the tongs, in connection with the peculiar form of said jaws, little difficulty will be experienced in turning the cheese as often as desired. In proportion to the weight of the cheese to be elevated is the power of the tongs to sustain the same, when held between the jaws thereof, increased, and consequently no apprehension need be entertained of accident occurring from the cheese slipping or falling from between said jaws.

The device is cheap, portable, and durable. The parts may be readily detached or put together, and with it a great deal of work can be performed in a very short space of time.

Having thus described my invention, the following is what I claim as new therein and desire to secure by Letters Patent:

1. The tongs G, in combination with the pivoted jaws J J and washers I I, constructed and operating as and for the purposes set forth.

2. In combination with the aforesaid tongs and pivoted jaws, the pedestal A, post or upright B, lever C, ring and staple D E, chains F F, and strap K, the whole being arranged and operated substantially as herein specified.

ALLISON MEARS.

Witnesses:
H. F. DENIO,
D. W. C. DOUGLASS.